US010969456B2

(12) United States Patent
Kobayashi et al.

(10) Patent No.: US 10,969,456 B2
(45) Date of Patent: Apr. 6, 2021

(54) CONTEXT SYSTEM FOR IMPROVED UNDERSTANDING OF VEHICLE-TO-EVERYTHING (V2X) COMMUNICATIONS BY V2X RECEIVERS

(71) Applicant: TOYOTA JIDOSHA KABUSHIKI KAISHA, Toyota (JP)

(72) Inventors: Hiromitsu Kobayashi, Mountain View, CA (US); Zhihao Jiang, Mountain View, CA (US)

(*) Notice: Subject to any disclaimer, the term of this patent is extended or adjusted under 35 U.S.C. 154(b) by 197 days.

(21) Appl. No.: 16/130,742

(22) Filed: Sep. 13, 2018

(65) Prior Publication Data
US 2020/0088830 A1    Mar. 19, 2020

(51) Int. Cl.
*G01S 1/02* (2010.01)
*G01S 1/68* (2006.01)
*H04W 4/40* (2018.01)

(52) U.S. Cl.
CPC .............. *G01S 1/024* (2013.01); *G01S 1/68* (2013.01); *H04W 4/40* (2018.02)

(58) Field of Classification Search
CPC ............ G01S 1/024; G01S 1/68; H04W 4/40; H04W 4/80
See application file for complete search history.

(56) References Cited

U.S. PATENT DOCUMENTS

| 2015/0381751 A1* | 12/2015 | Haran | H04W 4/46 709/217 |
| 2018/0152819 A1* | 5/2018 | Pinheiro | H04L 69/22 |
| 2019/0124490 A1* | 4/2019 | Wu | H04W 4/40 |

* cited by examiner

*Primary Examiner* — Dao L Phan
(74) *Attorney, Agent, or Firm* — Burbage Law, P.C.; Jon-Michael Burbage; Elizabeth Ruzich

(57) ABSTRACT

The disclosure describes embodiments for modifying an operation of a vehicle component based on a Vehicle-to-Everything (V2X) communication. In some embodiments, a method includes receiving, by a V2X receiver, a V2X message including context data that describes a context of a V2X transmitter in an environment, wherein the V2X receiver is not sufficiently able to identify the V2X transmitter as an originator of the V2X message within the environment. The method includes determining, by the V2X receiver, digital data describing an identity of the V2X transmitter as the originator of the V2X message within the environment based on the context data. The method includes modifying the operation of the vehicle component of the V2X receiver based on the digital data describing the identity of the V2X transmitter. The vehicle component includes, for example, one or more of an autonomous driving system and an Advanced Driver Assistance System (ADAS system).

20 Claims, 8 Drawing Sheets

600

| The context system of the remote vehicle compares the sensor data to the context data to identify which of the vehicles in the vicinity of the remote vehicle is the transmitter or originator of the V2X message. 323 |

> For example, if the context data describes a color of the ego vehicle and the lane of travel for the ego vehicle, then the sensor data captured by the onboard sensors of the remote vehicle at step 321 includes an image of the roadway environment. The context system of the remote vehicle analyzes the image to determine whether a vehicle having the color described by the context data is present and whether this vehicle is also traveling in the lane of travel which is described by the context data. If so, then this is a preliminary match. The context system may then compare other information included in the V2X data (e.g., speed, heading, acceleration, etc.) to determine whether the preliminary match is still good. If so, then the identity of the ego vehicle which transmitted the V2X message is now considered to be known. 324

> In another example, if the context data is an object prior of the ego vehicle, then the sensor data captured by the onboard sensors of the remote vehicle at step 321 includes an image of the roadway environment. The context system of the remote vehicle compares an image of the environment to the object prior of the ego vehicle to determine whether the roadway environment includes the ego vehicle and if so, which object in the roadway environment is actually the ego vehicle. This step may include: determining a number of objects in the image which is described by the sensor data collected at step 321; determining bounding boxes for each of the objects in the image; comparing the object prior to each of the objects included in each of the bounding boxes; and determining whether a match is present between the objects in the bounding boxes and the object prior which was described by the context data. 325

The context system of the remote vehicle inserts identity data in the V2X data to identify which of the vehicles in the vicinity of the remote vehicle is the transmitter or originator of the V2X message. 326

The context system of the remote vehicle causes an ADAS system or some other vehicle component of the remote vehicle to take a vehicular action responsive to the V2X data and the identity of the transmitter of the V2X message that included the V2X data. For example, the context system of the remote vehicle causes an ADAS system of the remote vehicle to execute a remedial action to avoid a collision with the ego vehicle, track the path of travel of the ego vehicle, or some other action which is beneficial to the remote vehicle. 327

Figure 3C

V2X DATA 195

- Vehicles and other client devices equipped with Dedicated Short Range Communication ("DSRC") transmit a V2X message (e.g., a Basic Safety Message, i.e., a "BSM") at a regular interval.

- Each BSM includes the following V2X data describing one or more of the following for the vehicle that originally sent the BSM:
    (1) GPS Data Describing the Location of the Vehicle;
    (2) Heading Data Describing a past Direction of travel for the Vehicle, if any;
    (3) Velocity Data Describing a past Velocity of the Vehicle;
    (4) Path History of Vehicle (e.g., path history data); and
    (5) Context Data describing the context of the Vehicle.

Figure 4

V2X DATA 195

Part 1

GPS Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2

Vehicle Path History
Future Vehicle Path Estimation
Hard Active Braking
Traction Control System active over 100 milliseconds?
Antilock Brake System active over 100 milliseconds?
Light Status
Wiper Status
Vehicle type
A unique identifier of the vehicle (e.g., a VIN number)
Context Data

Figure 5

CONTEXT DATA 191

The context data is digital data that describes a context of a V2X transmitter (e.g., an ego vehicle) of a V2X message (e.g., a DSRC message). The context incudes one or more of the following:

1. a color of the ego vehicle;
2. an image of the ego vehicle;
3. an object prior of the ego vehicle;
4. a description of which lane the ego vehicle is currently traveling in;
5. an image of a vehicle or object which is to the left of the ego vehicle;
6. an image of the vehicle or object that is to the right of the ego vehicle;
7. a description of the license plate number of the ego vehicle; and
8. some other identifying information.

<u>Dynamic Information as a Source for Context Data</u>: In some embodiments, the context data is described by the sensor data. For example, the context system generates the context data based on the sensor data. In these embodiments the context data may be something that is dynamic and changes over time such as: the ego vehicle's current lane of travel; and the images of the vehicles or objects to the left or right of the ego vehicle.

<u>Static Information as a Source for Context Data</u>: In some embodiments, the context data is encoded in context system at the time the ego vehicle is manufactured. In these embodiments, the context data is likely to be something which is static and does not change over time. For example, if the context system includes digital data describing an object prior of the ego vehicle, then the context system includes this digital data in the context data.

Figure 6

CONTEXT SYSTEM FOR IMPROVED UNDERSTANDING OF VEHICLE-TO-EVERYTHING (V2X) COMMUNICATIONS BY V2X RECEIVERS

BACKGROUND

The specification relates to a context system for Vehicle-to-Everything (V2X) communications. In some embodiments, the context system provides V2X receivers with improved understanding of the V2X data that is included in V2X messages that are transmitted by V2X transmitters.

After 2020, all vehicles sold in the United States will be required to be compliant with the Dedicated Short-Range Communication (DSRC) standard. Connected vehicles that are compliant with the DSRC standard broadcast DSRC messages. Connected vehicles that broadcast DSRC messages are referred to as "DSRC transmitters." Connected vehicles that receive the DSRC messages are referred to as "DSRC receivers." DSRC messages include DSRC data that describe state information about the DSRC transmitter (e.g., its location, speed, heading, etc.) that that is critical for the proper operation of Advanced Driver Assistance Systems (ADAS systems) and autonomous driving systems which are included in the DSRC receivers.

Unfortunately, DSRC receivers frequently struggle to understand which vehicles transmitted the DSRC message, thereby rendering the DSRC data included in the DSRC message less valuable as a data source for the DSRC receivers. Improved ability to identify the transmitter of different DSRC messages would significantly improve the performance of a connected ADAS systems in general, and autonomous driving systems in particular. Described herein are embodiments of a context system that provides a connected vehicle with the ability to identify the transmitter of different V2X messages (e.g., DSRC messages) received by the connected vehicle.

SUMMARY

Described herein are embodiments of a context system that is installed in an onboard vehicle computer of a connected vehicle (e.g., an "ego vehicle" or a "remote vehicle").

The embodiments of the context system may be described herein with reference to DSRC messages, DSRC transmitters, and DSRC receivers. However, in practice the context system works with any type of V2X communication and not just DSRC messages. Accordingly, the embodiments of the context system are not limited to benefitting DSRC communications and are easily modified to benefit any type V2X communication.

All references herein to a "DSRC message" may be replaced by the term "V2X message," all references herein to a "DSRC transmitter" may be replaced by the term "V2X transmitter," and all references herein to a "DSRC receiver" may be replaced by the term "V2X receiver." The embodiments are now described with reference to DSRC communications.

DSRC data is an example of V2X data. A DSRC receiver and a DSRC transmitter are examples of a V2X receiver and a V2X transmitter, respectively. Accordingly, a V2X receiver is a connected vehicle that receives a V2X message. A V2X transmitter is a connected vehicle that transmits a V2X message.

Vehicles that are compliant with the DSRC standard broadcast DSRC messages. Vehicles that broadcast DSRC messages are referred to as "DSRC transmitters." Vehicles that receive the DSRC messages are referred to as "DSRC receivers." DSRC messages include DSRC data that describes information about the DSRC transmitter (e.g., its location, speed, heading, etc.) that is critical for the proper operation of ADAS systems and autonomous driving systems which are included in the DSRC receivers. Unfortunately, DSRC receivers frequently struggle to understand which vehicle transmitted the DSRC message, thereby rendering the DSRC data included in the DSRC message less valuable as a data source for the DSRC receivers. Improved ability to identify the transmitter of different DSRC messages would significantly improve the performance of connected vehicles' ADAS systems in general, and their autonomous driving systems in particular. Described herein are embodiments of a context system that is operable to provide connected vehicles with the ability to identify the transmitter of different DSRC messages received by these connected vehicles.

The embodiments of the context system described herein solve the problem described in the preceding paragraph. In some embodiments, the context system includes software installed in an ego vehicle that transmits DSRC messages (i.e., the "DSRC transmitter"). The context system continuously analyzes sensor data generated by the onboard sensors of the ego vehicle to proactively determine whether remote vehicles that receive the DSRC messages (i.e., the "DSRC receivers") are sufficiently able to identify the ego vehicle as being the originator or transmitter of the DSRC messages. If the context system determines that remote vehicles are not sufficiently able to identify the ego vehicle as the originator or transmitter of the DSRC message, then the context system proactively generates context data (see, e.g., FIG. 6) which is included in the DSRC data so that remote vehicles are guaranteed to be able to identify the ego vehicle as the transmitter of the DSRC message. There is no existing solution that includes a DSRC transmitter having software that (1) proactively identifies whether DSRC receivers are able to sufficiently able to identify the DSRC transmitter as the originator or transmitter of a DSRC message and then (2) proactively modifies the content of the DSRC message to include digital data [e.g., context data] that is operable to ensure that the DSRC receivers are sufficiently able identify the correct originator or transmitter of the DSRC message.

The existing solutions are inadequate to solve this problem because they always require DSRC receivers to work alone (and not in cooperation with the DSRC transmitter) to identify if they are struggling to identify the correct transmitter or originator of a DSRC message, which is problematic because: (1) the DSRC transmitter is sometimes in the best position to know whether a DSRC receiver will struggle to identify it as the originator or transmitter of a DSRC message; and (2) the DSRC transmitter is sometimes in the best position to assist the DSRC receiver to identify it as the originator or transmitter of a DSRC message.

Embodiments of the context system are now described. A DSRC transmitter may be referred to herein as an "ego vehicle." A second connected vehicle that receives the DSRC message is a DSRC receiver. A DSRC receiver may be referred to herein as a "remote vehicle." The DSRC message includes digital data referred to as DSRC data that describes the ego vehicle. For example, the DSRC data describes a speed, heading and location of the ego vehicle. The V2X data depicted in FIGS. 4 and 5 are an example of the DSRC data according to some embodiments of the context system described herein.

In some implementations, many vehicles may be on the roadway at the same time, and it may be difficult for the remote vehicles that receive DSRC message to determine which of these other vehicles is the original transmitter of a DSRC message, and so, the remote vehicle is unable to identify which of these other vehicles is described by the DSRC data included in the DSRC message. In other words, in some implementations it is difficult for a DSRC receiver to identify which vehicle on a roadway is the ego vehicle.

In some embodiments, the context system includes software installed in an electronic control unit (ECU) of an ego vehicle. An ECU is an example of an onboard vehicle computer. In some embodiments, the context system is operable, when executed by the ECU of the ego vehicle, to analyze sensor data generated by the onboard sensors of the ego vehicle to determine if the remote vehicles will have a difficult time identifying the ego vehicle as the transmitter of a DSRC message transmitted by the ego vehicle. If the context system determines that remote vehicles will have difficulty identifying the ego vehicle as the transmitter of the DSRC message, then the context system generates context data that provides additional identifying information of the ego vehicle. The context system then inserts the context data in Part 2 of the DSRC data (which is itself an example of V2X data; see, e.g., FIG. 5). The context system then causes the DSRC transmitter of the ego vehicle to transmit the DSRC message including the DSRC data (or the V2X data) which is itself modified to include the context data.

An advantage and improvement provided by the context system relative to the existing solutions is now described. Specifically, for DSRC transmitters that include the context system, the DSRC transmitter (e.g., an ego vehicle) takes proactive responsibility for determining whether DSRC receivers (e.g., a remote vehicle) will have a difficult time identifying the ego vehicle as the transmitter of the DSRC message. By comparison, the existing solutions place all the responsibility on the remote vehicles that receive the DSRC message for identifying the transmitter of a DSRC message without any assistance or consideration by the ego vehicle that transmits the DSRC message. Other advantages and improvements relative to the existing solutions are described herein.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for modifying an operation of a vehicle component based on a vehicle-to-everything (V2X) communication, the method including: receiving, by a V2X receiver, a V2X message including context data that describes a context of a V2X transmitter in an environment, where the V2X receiver is not sufficiently able to identify the V2X transmitter as an originator of the V2X message within the environment; determining, by the V2X receiver, digital data describing an identity of the V2X transmitter as the originator of the V2X message within the environment based on the context data; and modifying the operation of the vehicle component of the V2X receiver based on the digital data describing the identity of the V2X transmitter. Other embodiments of this aspect include corresponding computer systems, apparatus, and computer programs recorded on one or more computer storage devices, each configured to perform the actions of the methods.

Implementations may include one or more of the following features. The method where the V2X message is a DSRC message. The method where the V2X message is not one of the following: a WiFi message; a 3G message; a 4G message; a 5G message; a long-term evolution (LTE) message; a millimeter wave communication message; a Bluetooth message; and a satellite communication. The method where the V2X message is a basic safety message. The method where the context data describes a location of the V2X transmitter with an accuracy of substantially plus or minus half a width of a roadway which is being traveled by the V2X transmitter. The method where the V2X transmitter is an ego vehicle. The method where the V2X receiver is an autonomous vehicle. Implementations of the described techniques may include hardware, a method or process, or computer software on a computer-accessible medium.

One general aspect includes a system for modifying an operation of a vehicle component based on a V2X communication, the system included in a V2X receiver and including: a processor; and a non-transitory memory communicatively coupled to the processor, where the non-transitory memory stores computer code that is operable, when executed by the processor, to cause the processor to execute steps including: receiving a V2X message including context data that describes a context of a V2X transmitter in an environment, where the V2X receiver is not sufficiently able to identify the V2X transmitter as an originator of the V2X message within the environment; determining digital data describing an identity of the V2X transmitter as the originator of the V2X message within the environment based on the context data; and modifying the operation of the vehicle component of the V2X receiver based on the digital data describing the identity of the V2X transmitter. Other embodiments of this aspect include corresponding computer systems, apparatus, and computer programs recorded on one or more computer storage devices, each configured to perform the actions of the methods.

Implementations may include one or more of the following features. The system where the V2X message is a DSRC message. The system where the V2X message is not one of the following: a WiFi message; a 3G message; a 4G message; a 5G message; an LTE message; a millimeter wave communication message; a Bluetooth message; and a satellite communication. The system where the V2X message is a basic safety message. The system where the context data describes a location of the V2X transmitter with an accuracy of substantially plus or minus half a width of a roadway which is being traveled by the V2X transmitter. The system where the V2X transmitter is an ego vehicle. The system where the V2X receiver is an autonomous vehicle. Implementations of the described techniques may include hardware, a method or process, or computer software on a computer-accessible medium.

One general aspect includes a computer program product operable to modify an operation of a vehicle component based on a V2X communication, where the computer program product includes instructions that, when executed by a processor of a V2X receiver, causes the processor to perform operations including: receiving a V2X message including context data that describes a context of a V2X transmitter in an environment, where the V2X receiver is not sufficiently able to identify the V2X transmitter as an originator of the V2X message within the environment; determining digital data describing an identity of the V2X transmitter as the originator of the V2X message within the environment based on the context data; and modifying the operation of the vehicle component of the V2X receiver based on the digital data describing the identity of the V2X transmitter. Other embodiments of this aspect include corresponding computer systems, apparatus, and computer programs recorded on one or more computer storage devices, each configured to perform the actions of the methods.

Implementations may include one or more of the following features. The computer program product where the V2X message is a DSRC message. The computer program product where the V2X message is not one of the following: a WiFi message; a 3G message; a 4G message; a 5G message; a long-term evolution LTE message; a millimeter wave communication message; a Bluetooth message; and a satellite communication. The computer program product where the context data describes a location of the V2X transmitter with an accuracy of substantially plus or minus half a width of a roadway which is being traveled by the V2X transmitter. The computer program product where the V2X transmitter is an ego vehicle. The computer program product where the V2X receiver is an autonomous vehicle. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 3A-3C depicts a method for modifying an operation of a vehicle component based on V2X data that includes context data according to some embodiments.

FIGS. 4 and 5 are block diagrams illustrating an example of V2X data according to some embodiments.

FIG. 6 is a block diagram illustrating an example of context data according to some embodiments.

DETAILED DESCRIPTION

Figure 1:
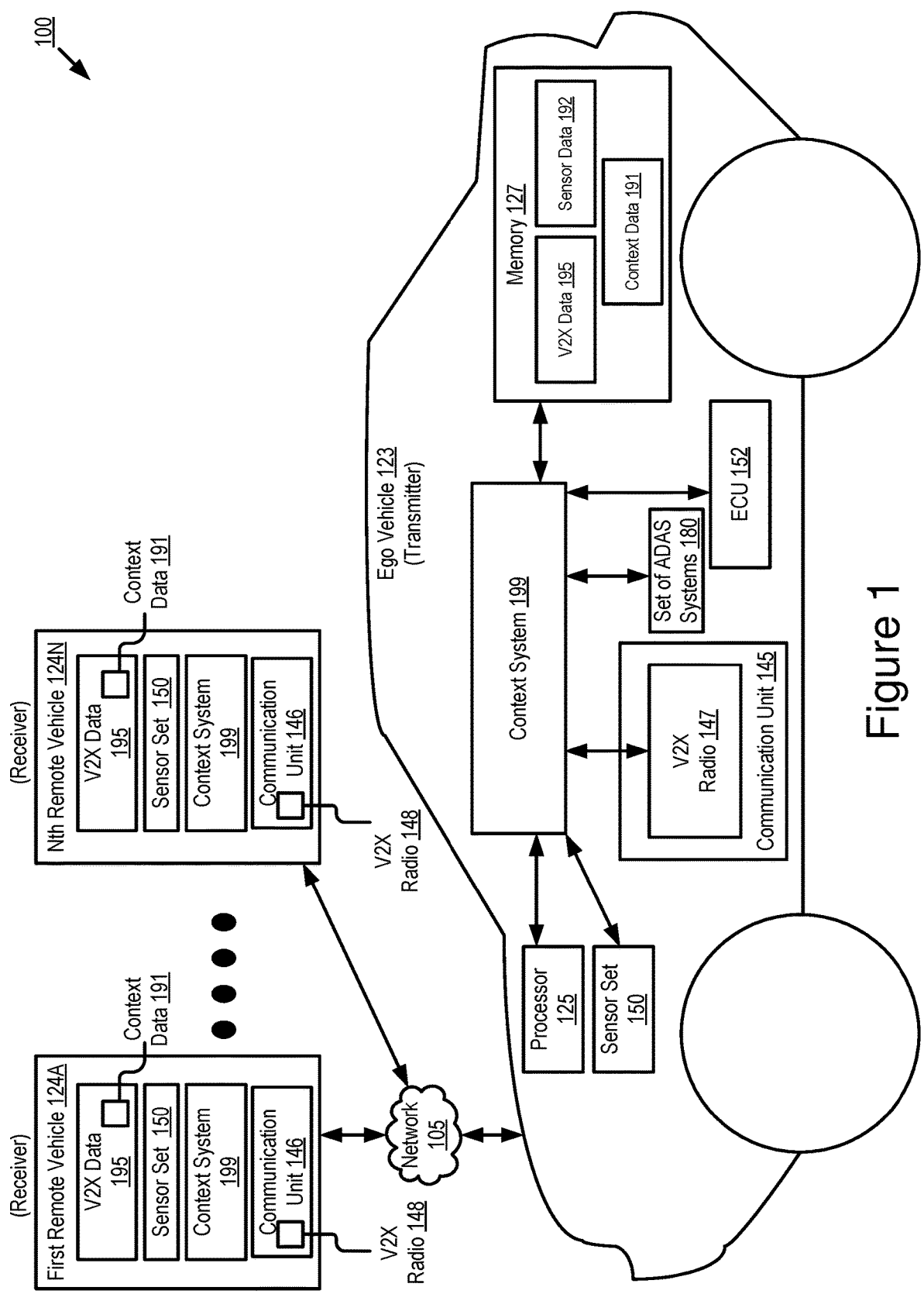
FIG. 1 is a block diagram illustrating an operating environment for a context system according to some embodiments.

Embodiments of a context system are now described. The context system is operable to provide improved V2X communication. In some embodiments, the context system provides V2X receivers with improved understanding of the V2X data that is included in V2X messages that are transmitted by V2X transmitters. Examples of V2X communication include one or more of the following: DSRC (including Basic Safety Messages, among other types of DSRC communication); LTE; millimeter wave communication; full-duplex wireless communication; 3G; 4G; 5G; LTE-Vehicle-to-Everything (LTE-V2X); LTE-Vehicle-to-Vehicle (LTE-V2V); LTE-Device-to-Device (LTE-D2D); Voice over LTE (VoLTE); 5G-Vehicle-to-Everything (5G-V2X); etc.

In some embodiments, a connected vehicle (e.g., an "ego vehicle" or a "remote vehicle") that includes the context system is a DSRC-equipped vehicle. A DSRC-equipped vehicle is a vehicle which: (1) includes a DSRC radio; and (2) is operable to lawfully send and receive DSRC messages in a jurisdiction where the DSRC-equipped vehicle is located. The DSRC radio is operable to wirelessly send and receive DSRC messages.

A "DSRC-equipped" device is a processor-based device that includes a DSRC radio and is operable to lawfully send and receive DSRC messages in a jurisdiction where the DSRC-equipped device is located. Various endpoints may be DSRC-equipped devices, including, for example, a roadside unit (RSU), a smartphone, a tablet computer and any other processor-based computing device that includes a DSRC radio and is operable to lawfully send and receive DSRC messages as described above.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In the United States and Europe, DSRC messages are transmitted at 5.9 GHz. In the United States, DSRC messages are allocated 75 MHz of spectrum in the 5.9 GHz band. In Europe, DSRC messages are allocated 30 MHz of spectrum in the 5.9 GHz band. In Japan, DSRC messages are transmitted in the 760 MHz band with 10 MHz of spectrum. A wireless message, therefore, is not a DSRC message unless it operates in the 5.9 GHz band in the United States and Europe or the 760 MHz band in Japan. A wireless message is also not a DSRC message unless it is transmitted by a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC radio, and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

The wireless messages of key fobs made as a component of a remote keyless entry system are not DSRC messages for additional reasons. For example, the payload for a DSRC message is also required to include digital data describing a rich amount of vehicular data of various types of data. In general, a DSRC message always includes, at a minimum, a unique identifier of the vehicle which transmits the DSRC message as well as the Global Positioning System (GPS) data for that vehicle. This amount of data requires a larger bandwidth than what is possible for other types of non-DSRC wireless messages. For example, FIGS. 4 and 5 depict examples of a permissible payload for a particular type of DSRC message referred to as a Basic Safety Message ("BSM" if singular, "BSMs" if plural). The wireless messages of key fobs as a component of a remote keyless entry system are not DSRC messages because they do not include a payload which is permissible under the DSRC standard. For example, a key fob merely transmits a wireless message including a digital key which is known to a vehicle which is paired with the key fob; there is not sufficient bandwidth for other data to be included in the payload because the bandwidth allocated for these transmissions is very small. By comparison, DSRC messages are allocated large amounts of bandwidth and are required to include a far richer amount of data, including, for example, a unique identifier and the GPS data for the vehicle which transmitted the DSRC message.

Embodiments of the context system are now described. A connected vehicle broadcasts a DSRC message and is referred to as a DSRC transmitter. A DSRC transmitter may be referred to herein as an "ego vehicle." A second connected vehicle that receives the DSRC message is a DSRC receiver. A DSRC receiver may be referred to herein as a "remote vehicle." The DSRC message includes digital data referred to as DSRC data that describes the ego vehicle. For example, the DSRC data describes a speed, heading and location of the ego vehicle.

An example problem is that many vehicles may be on the roadway at the same time, and it may be difficult for the remote vehicles that receive a DSRC message (or a V2X message) to determine which of these other vehicles is the original transmitter (an "originator") of a DSRC message (or V2X message), and so, the remote vehicle is unable to identify which of these other vehicles is described by the DSRC data included in the DSRC message (or the V2X data included in a V2X message). In other words, it is difficult for a DSRC receiver (or V2X receiver) to identify which vehicle on a roadway is the ego vehicle.

In some embodiments, the context system includes software installed in an ECU of an ego vehicle. A separate instance of the context system is installed in an ECU of a remote vehicle. The context system is operable, when executed by the ECU of the ego vehicle, to analyze sensor data generated by the onboard sensors of the ego vehicle to determine if the remote vehicles will have a difficult time identifying the ego vehicle as the transmitter of a DSRC message transmitted by the ego vehicle. If the context system determines that remote vehicles will have difficulty identifying the ego vehicle as the transmitter of the DSRC message, then the context system of the ego vehicle generates context data that provides additional identifying information of the ego vehicle. The context system of the ego vehicle then inserts the context data in Part 2 of the DSRC data included in the DSRC message. The context system of the ego vehicle then causes the DSRC radio of the ego vehicle to transmit the DSRC message including the DSRC data which is itself modified to include the context data.

In some embodiments, the context system includes software installed in an ECU of an ego vehicle. A separate instance of the context system is installed in an ECU of a remote vehicle. The context system is operable, when executed by the ECU of the ego vehicle, to analyze sensor data generated by the onboard sensors of the ego vehicle to determine if the remote vehicles will have a difficult time identifying the ego vehicle as the transmitter of a V2X message transmitted by the ego vehicle. If the context system determines that remote vehicles will have difficulty identifying the ego vehicle as the transmitter (or originator) of the V2X message, then the context system of the ego vehicle generates context data that provides additional identifying information of the ego vehicle. For example, the context data describes a context of the ego vehicle within a roadway environment that includes the ego vehicle and perhaps the remote vehicle. The context system of the ego vehicle then inserts the context data in Part 2 of the V2X data included in the V2X message (see, e.g., FIG. 5). The context system of the ego vehicle then causes the V2X radio of the ego vehicle to transmit the V2X message including the V2X data which is itself modified to include the context data.

Referring to FIG. 1, depicted is an operating environment 100 for a context system 199 according to some embodiments. As depicted, the operating environment 100 includes an ego vehicle 123, a first remote vehicle 124A . . . and an Nth remote vehicle 124N (wherein "N" indicates that the operating environment includes any positive whole number of remote vehicles). These elements are communicatively coupled to one another by a network 105.

The first remote vehicle 124A . . . and the Nth remote vehicle 124N may be referred to herein collectively or individually as "the remote vehicle 124." Although one ego vehicle 123 and one network 105 are depicted in FIG. 1, in practice the operating environment 100 may include one or more ego vehicles 123 and one or more networks 105.

In some embodiments, the ego vehicle 123 is a DSRC transmitter of a DSRC message and the remote vehicle 124 is a DSRC receiver of the DSRC message. In some embodiments, the ego vehicle 123 is a V2X transmitter of a V2X message and the remote vehicle 124 is a V2X receiver of the V2X message.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, 5G, LTE-V2V, LTE-V2X, LTE-D2D, VoLTE, 5G-V2X or any other mobile data network or combination of mobile data networks. Further, the network 105 may include one or more IEEE 802.11 wireless networks. The network 105 may include any type of V2X network described herein.

The following are endpoints of the network 105: the ego vehicle 123; and the remote vehicle 124.

The ego vehicle 123 is any type of connected vehicle. For example, the ego vehicle 123 is one of the following types of vehicles: a car; a truck; a sports utility vehicle; a bus; a semi-truck; a robotic car; a drone or any other roadway-based conveyance. In some embodiments, the ego vehicle 123 is a DSRC-equipped vehicle.

In some embodiments, the ego vehicle 123 is an autonomous vehicle or a semi-autonomous vehicle. For example, the ego vehicle 123 includes a set of Advanced Driver Assistance Systems 180 (a set of "ADAS systems 180") which provide autonomous features to the ego vehicle 123 which are sufficient to render the ego vehicle 123 an autonomous vehicle.

The National Highway Traffic Safety Administration ("NHTSA") has defined different "levels" of autonomous vehicles, e.g., Level 0, Level 1, Level 2, Level 3, Level 4, and Level 5. If an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower level number. The different levels of autonomous vehicles are described briefly below.

Level 0: The set of ADAS systems 180 installed in a vehicle (e.g., the ego vehicle 123) have no vehicle control. The set of ADAS systems 180 may issue warnings to the driver of the vehicle. A vehicle which is Level 0 is not an autonomous or semi-autonomous vehicle.

Level 1: The driver must be ready to take driving control of the autonomous vehicle at any time. The set of ADAS systems 180 installed in the autonomous vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems 180 installed in the autonomous vehicle fail to respond properly (based on the driver's subjective judgement). The set of ADAS systems 180 installed in the autonomous vehicle executes accelerating, braking, and steering. The set of ADAS systems 180 installed in the autonomous vehicle can deactivate immediately upon takeover by the driver.

Level 3: Within known, limited environments (such as freeways), the driver can safely turn their attention away from driving tasks but must still be prepared to take control of the autonomous vehicle when needed.

Level 4: The set of ADAS systems 180 installed in the autonomous vehicle can control the autonomous vehicle in all but a few environments such as severe weather. The driver must enable the automated system (which is comprised of the set of ADAS systems 180 installed in the ego vehicle 123) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

A highly autonomous vehicle (HAV) is an autonomous vehicle that is Level 3 or higher.

Accordingly, in some embodiments the ego vehicle 123 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The set of ADAS systems 180 may include one or more of the following types of ADAS systems: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system (also referred to as a lane keep assistant); a pedestrian protection system; a traffic sign recognition system; a turning assistant; a wrong-way driving warning system; autopilot; sign recognition; and sign assist. Each of these example ADAS systems provide their own features and functionality that may be referred to herein as an "ADAS feature" or "ADAS functionality," respectively. The features and functionality provided by these example ADAS systems are also referred to herein as an "autonomous feature" or an "autonomous functionality," respectively.

In some embodiments, the set of ADAS systems 180 includes an autonomous driving system of the ego vehicle 123 which provides autonomous driving functionality to the ego vehicle 123.

The ECU 152 is an onboard vehicle computer system. In some embodiments, the ECU 152 is a conventional ECU. In some embodiments, the ECU 152 stores and executes an instance of the context system 199. In some embodiments, the ECU 152 stores and executes one or more instances of one or more ADAS systems.

In some embodiments, the ego vehicle 123 includes the following elements: a processor 125; a memory 127; a sensor set 150; a communication unit 145; the set of ADAS systems 180; the ECU 152; and a context system 199.

In some embodiments, the processor 125 and the memory 127 may be elements of an onboard vehicle computer system (such as computer system 200 described below with reference to FIG. 2). In some embodiments, the ECU 152 is an example of the onboard vehicle computer system. The onboard vehicle computer system may be operable to cause or control the operation of the context system 199 of the ego vehicle 123. The onboard vehicle computer system may be operable to access and execute the data stored on the memory 127 to provide the functionality described herein for the context system 199 of the ego vehicle 123 or its elements (see, e.g., FIG. 2). The onboard vehicle computer system may be operable to execute the context system 199 which causes the onboard vehicle computer system to execute one or more steps of one or more of the method 300 described below with reference to FIGS. 3A-3C.

In some embodiments, the processor 125 and the memory 127 may be elements of an onboard unit. The onboard unit includes the ECU 152 or some other onboard vehicle computer system that may be operable to cause or control the operation of the context system 199. The onboard unit may be operable to access and execute the data stored on the memory 127 to provide the functionality described herein for the context system 199 or its elements. The onboard unit may be operable to execute the context system 199 which causes the onboard unit to execute one or more steps of one or more of the method 300 described below with reference to FIGS. 3A-3C. In some embodiments, the computer system 200 depicted in FIG. 2 is an example of an onboard unit.

In some embodiments, the ego vehicle 123 may include a sensor set 150. The sensor set 150 includes one or more sensors that are operable to measure the physical environment outside of the ego vehicle 123. For example, the sensor set 150 includes one or more sensors that record one or more physical characteristics of the physical environment that is proximate to the ego vehicle 123. The memory 127 may store sensor data 192 that describes the one or more physical characteristics recorded by the sensor set 150.

In some embodiments, the sensor data 192 includes digital data that describes, among other things, the information which is described by the V2X data 195. Examples of the V2X data 195 are depicted in FIGS. 4 and 5 according to some embodiments. In some embodiments, the sensor set 150 includes any sensors that are necessary to record the V2X data 195. In some embodiments, the V2X data 195 includes the sensor data 192 that describes the information which is described by the V2X data 195.

In some embodiments, the V2X data 195 is an example of DSRC data which is included in a DSRC message In some embodiments, the sensor data 192 includes digital data that describes, among other things, the information which is described by the context data 191. An example of the context data 191 is depicted in FIG. 6 according to some embodiments. In some embodiments, the context data 191 includes digital data that describes a context of the ego vehicle 123 within a roadway environment. In some embodiments, the sensor set 150 includes any sensors that are necessary to record the context data 191. In some embodiments, the context data 191 includes the sensor data 192 that describes the information which is described by the context data 191. In some embodiments, the context data 191 is an element of the V2X data 195 or a version of the V2X data 195 that is modified to include the context data 191.

In some embodiments, the sensor set 150 of the ego vehicle 123 includes one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

In some embodiments, the sensor set 150 includes any sensors which are necessary to record the information included in the V2X data 195 or provide any of the other functionality described herein.

In some embodiments, the sensor set 150 includes any sensors which are necessary to record the information included in the context data 191 or provide any of the other functionality described herein.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 123 may include one or more processors 125. Other processors, operating systems, sensors, displays, and physical configurations may be possible.

The memory 127 is a non-transitory memory that stores instructions or data that may be accessed and executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random-access memory (virtual RAM). The ego vehicle 123 may include one or more memories 127.

In some embodiments, the memory 127 stores, as digital data, any data described herein. In some embodiments, the memory 127 stores any data that is necessary for the context system 199 to provide its functionality.

As depicted, the memory 127 stores: the sensor data 192; the V2X data 195; and the context data 191.

In some embodiments, the V2X data 195 is digital data that is included as the payload for a V2X message (e.g., a DSRC message, a BSM, or any other type of V2X message) that is transmitted or received by the V2X radio 147 or the communication unit 145. The V2X data 195 is described in more detail below with reference to FIGS. 4 and 5. The context data 191 may be an element of the V2X data 195 or the context data 191 may be an element of a version of the V2X data 195 that is modified to include the context data 191. The context data 191 is described in more detail below with reference to FIG. 6.

The communication unit 145 transmits and receives data to and from a network 105 or to another communication channel. In some embodiments, the communication unit 145 may include a DSRC transceiver, a DSRC receiver, and any other hardware or software necessary to make the ego vehicle 123 a DSRC-equipped device. For example, the V2X radio 147 is a DSRC radio and any other hardware or software necessary to make the ego vehicle 123 a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, or any other type of V2X communication.

In some embodiments, the communication unit 145 includes a V2X radio 147. In some embodiments, the V2X radio 147 is an electronic device that includes a V2X transmitter and a V2X receiver that is operable to send and receive wireless messages via any V2X protocol. For example, the V2X radio 147 is operable to send and receive wireless messages via the DSRC protocol.

In some embodiments, the V2X transmitter is operable to transmit and broadcast DSRC messages over the 5.9 GHz band. The V2X receiver is operable to receive DSRC messages over the 5.9 GHz band. The V2X radio 147 includes seven channels (e.g., DSRC channel numbers 172, 174, 176, 178, 180, 182 and 184) with at least one of these channels reserved for sending and receiving BSMs (e.g., DSRC channel number 172 is reserved for BSMs). In some embodiments, at least one of these channels is reserved for sending and receiving Pedestrian Safety Messages (PSMs) as described in U.S. patent application Ser. No. 15/796,296 filed on Oct. 27, 2017 and entitled "PSM Message-based Device Discovery for a Vehicular Mesh Network," the entirety of which is hereby incorporated by reference. In some embodiments, DSRC channel number 172 is reserved for sending and receiving PSMs. In some embodiments, DSRC channel number 176 is reserved for sending and receiving PSMs.

In some embodiments, the V2X radio 147 includes a non-transitory memory which stores digital data that controls the frequency for broadcasting BSMs. In some embodiments, the non-transitory memory stores a buffered version of the GPS data for the ego vehicle 123 so that the GPS data for the ego vehicle 123 is broadcast as an element of the BSMs (e.g., as an element of the V2X data 195) which are regularly broadcast by the V2X radio 147.

In some embodiments, the V2X radio 147 includes any hardware or software which is necessary to make the ego vehicle 123 compliant with the DSRC standards.

In some embodiments, the V2X radio 147 includes a single channel that is dedicated to sending and/or receiving a particular type of wireless message. For example, the V2X radio 147 includes a single channel that is dedicated to sending and receiving BSMs. In another example, the V2X radio 147 includes a single channel that is dedicated to receiving PSMs.

In some embodiments, the context system 199 includes software that is operable, when executed by the processor 125, to cause the processor 125 to execute one or more steps of the method 300 described below with reference to FIGS. 3A-3C. The functionality of the context system 199 is described in more detail below according to some embodiments.

In some embodiments, the context system 199 is implemented using hardware including a field-programmable gate array ("FPGA") or an application-specific integrated circuit ("ASIC"). In some other embodiments, the context system 199 implemented using a combination of hardware and software.

The remote vehicle 124 is a connected vehicle similar to the ego vehicle 123. The remote vehicle 124 includes elements that are similar to those included in the ego vehicle 123. As depicted, the remote vehicle 124 includes a context system 199 and a communication unit 146 having a V2X radio 148. The communication unit 146 and the V2X radio 148 provide similar functionality as the communication unit 145 and the V2X radio 147 described above for the ego vehicle 123, and so, those descriptions will not be repeated here. The context system 199 of the remote vehicle 124 provides similar functionality as the context system 199 of the ego vehicle 123, and so, that description will not be repeated here. The remote vehicle 124 may include any of the elements that are included in the ego vehicle 123.

The context system 199 may be described herein with reference to DSRC, but the functionality of the context system 199 is not limited to DSRC. Instead, the context system 199 works with any V2X communication protocol including, among others, LTE-V2X and 5G-V2X.

In some embodiments, the ego vehicle 123 broadcasts a V2X message which is received by the remote vehicles 124. This V2X message includes V2X data. The V2X data describes information about the ego vehicle 123 which may be critical for the remote vehicles 124. For example, a remote vehicle 124 may be an autonomous vehicle that needs to track the past movements, current movements, and future movements each of the other vehicles in its environment (such as the ego vehicle 123). When the remote vehicle 124 receives a V2X message, it needs to identify which of the vehicles in its environment transmitted this V2X message so that it will know which of these vehicles is described by the V2X data included in the V2X message. For example, assume a remote vehicle 124 is traveling on a roadway with a large number of vehicles in its vicinity. One of the vehicles in the vicinity of the remote vehicle 124 is the ego vehicle 123 which broadcast the V2X message that was received by the remote vehicle 124. The V2X data included in this V2X message may describe an important or dangerous event (e.g., the V2X data describes that the ego vehicle 123 expects to suddenly change its heading, speed, or take some action that might cause a collision with the remote vehicle 124) and the remote vehicle 124 needs to know which of the vehicles in its vicinity is the ego vehicle 123 so that the remote vehicle 124 will know how to avoid a collision with the ego vehicle 123 due to the change which is described by the V2X data. The V2X data imprecisely describes the geographic location of the ego vehicle 123 (e.g., with a precision of plus or minus 10 meters). The precision of this geographic information is insufficient to enable the remote vehicle 124 to identify which of the vehicles on the roadway is actually the ego vehicle 123. So, in practice, the V2X data is insufficient to enable vehicles such as the remote vehicle 124 to be able to quickly, accurately, and reliably identify which of the other vehicles on the roadway is an ego vehicle 123 that transmitted a particular V2X message which is received by the remote vehicle 124. The context data 191 provided by the context system 199 solves this problem.

In some embodiments, the context data 191 is digital data that describes the context of the ego vehicle 123 so that the one or more remote vehicles 124 can identify or locate the ego vehicle 123 among many other vehicles. The context data 191 describes one or more of the following: a color of the ego vehicle 123; an image of the ego vehicle 123; an object prior of the ego vehicle 123; a description of which lane the ego vehicle 123 is currently traveling in; an image of a vehicle or object which is to the left of the ego vehicle 123 (as recorded by the sensor set 150); an image of the vehicle or object that is to the right of the ego vehicle 123 (as recorded by the sensor set 150); a description of the license plate number of the ego vehicle 123 (or some other unique identifier of the ego vehicle 123); and some other identifying information of the ego vehicle 123.

In some embodiments, the context data 191 has a dynamic source. For example, the context data 191 is described by the sensor data 192. For example, the context system 199 generates the context data 191 based on the sensor data 192. In these embodiments the context data 191 is something that is dynamic and changes over time such as: a current lane of travel of the ego vehicle 123; and the images of the vehicles or objects to the left or right of the ego vehicle 123.

In some embodiments, the context data 191 has a static source. For example, the context data 191 is encoded in context system 199 at the time the ego vehicle 123 is manufactured (or at the time that an onboard vehicle computer that stores the context system 199 is manufactured). In these embodiments, the context data 191 is static and does not change over time. For example, if the context system 199 includes digital data describing an object prior of the ego vehicle 123, then the context system 199 includes this digital data in the context data 191. In some embodiments, context data 191 that is not sourced from sensor data 192 is described as being from a static source. In some embodiments, context data 191 that does not change over time is described as being from a static source.

In some embodiments, the context data 191 has a dynamic source and a static source. For example, the context data 191 includes a combination of sensor data 192 and digital data that is encoded in the context system 199 at a time of manufacture.

Example Computer System

Figure 2:
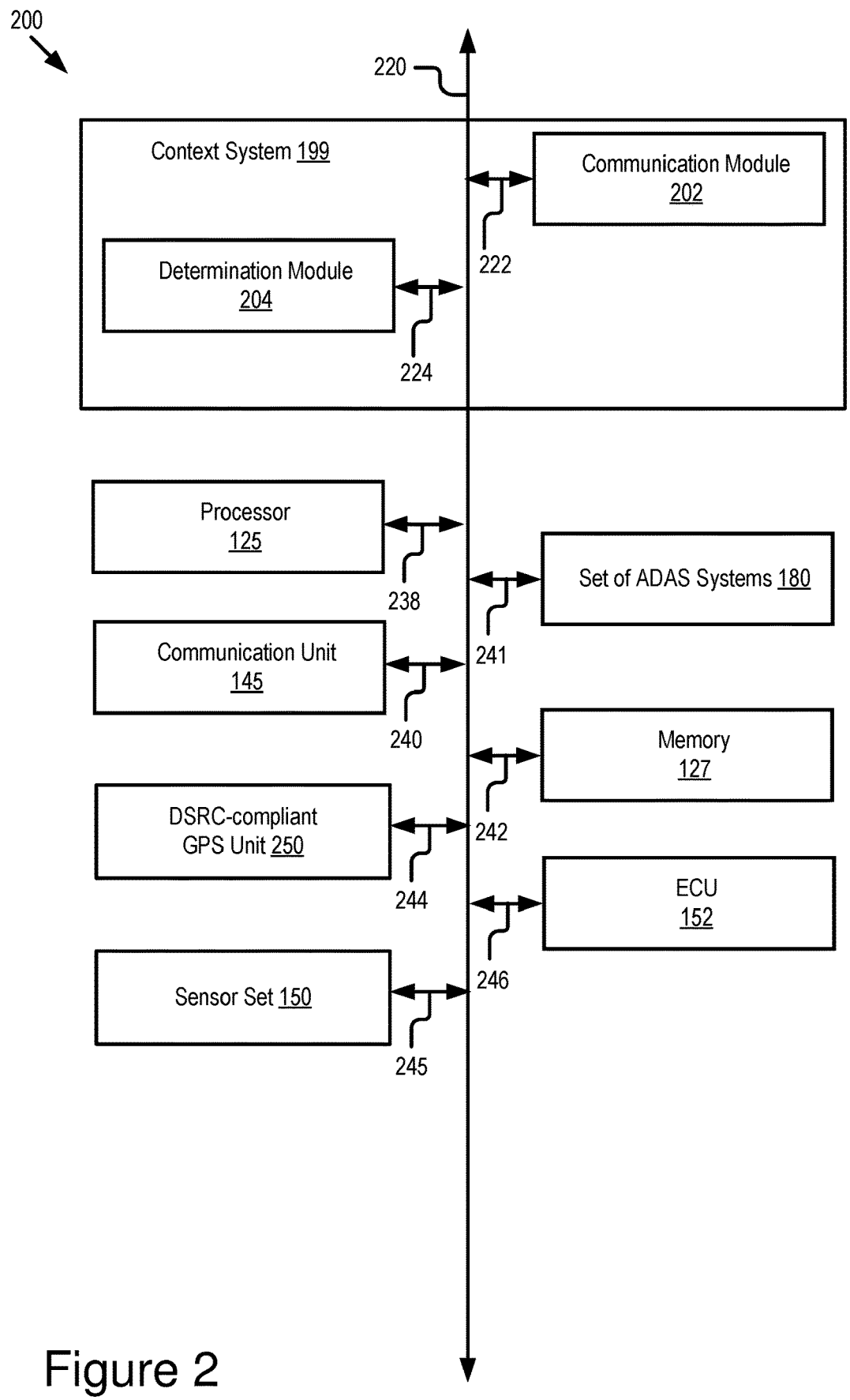
FIG. 2 is a block diagram illustrating an example computer system including the context system according to some embodiments.

Referring now to FIG. 2, depicted is a block diagram illustrating an example computer system 200 including the context system 199 according to some embodiments. In some embodiments, the computer system 200 may include a special-purpose computer system that is programmed to perform one or more steps of one or more of the method 300 described below with reference to FIGS. 3A-3C. In some embodiments, the computer system 200 is an onboard vehicle computer of the ego vehicle 123 or a remote vehicle 124. In some embodiments, the computer system 200 is an onboard unit of the ego vehicle 123 or a remote vehicle 124. In some embodiments, the computer system 200 is an ECU, head unit or some other processor-based computing device of the ego vehicle 123 or a remote vehicle 124.

The computer system 200 includes one or more of the following elements according to some examples: the context system 199; the processor 125; the communication unit 145; the memory 127; the set of ADAS systems 180; the sensor set 150; the ECU 152; and a DSRC-compliant GPS unit 250. The components of the computer system 200 are communicatively coupled by a bus 220.

In the illustrated embodiment, the processor 125 is communicatively coupled to the bus 220 via a signal line 238. The communication unit 145 is communicatively coupled to the bus 220 via a signal line 240. The memory 127 is communicatively coupled to the bus 220 via a signal line 242. The set of ADAS systems 180 is communicatively coupled to the bus 220 via a signal line 241. The sensor set 150 is communicatively coupled to the bus 220 via a signal line 245. The ECU 152 is communicatively coupled to the bus 220 via a signal line 246. The DSRC-compliant GPS unit 250 is communicatively coupled to the bus 220 via a signal line 244.

The following elements were described above with reference to FIG. 1, and so, those descriptions will not be repeated here: the processor 125; the communication unit 145; the memory 127; the set of ADAS systems 180; the sensor set 150; and the ECU 152.

The memory 127 may store any of the data described above with reference to FIG. 1 or below with reference to FIGS. 2-6. The memory 127 may store any data needed for the computer system 200 to provide its functionality.

In some embodiments, the DSRC-compliant GPS unit 250 includes any hardware and software necessary to make the ego vehicle 123, computer system 200, or the DSRC-compliant GPS unit 250 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the DSRC-compliant GPS unit 250 is a GPS unit that is operable to provide GPS data describing the location of the ego vehicle 123 with lane-level accuracy. For example, the ego vehicle 123 is traveling in a lane of a roadway. Lane-level accuracy means that the location of the ego vehicle 123 is described by the GPS data so accurately that the lane of travel of the ego vehicle 123 within the roadway may be accurately determined based on the GPS data for this ego vehicle 123 as provided by the DSRC-compliant GPS unit 250. In some embodiments, the GPS data is an element of the BSM data 195 (see, e.g., FIGS. 4 and 5).

In some embodiments, the DSRC-compliant GPS unit 250 includes hardware that wirelessly communicates with a GPS satellite to retrieve GPS data that describes the geographic location of the ego vehicle 123 with a precision that is compliant with the DSRC standard. The DSRC standard requires that GPS data be precise enough to infer if two vehicles (one of which is, for example, the ego vehicle 123) are located in adjacent lanes of travel. In some embodiments, the DSRC-compliant GPS unit 250 is operable to identify, monitor and track its two-dimensional position within 1.5 meters of its actual position 68% of the time under an open sky. Since driving lanes are typically no less than 3 meters wide, whenever the two-dimensional error of the GPS data is less than 1.5 meters the drowsy detection system 199 described herein may analyze the GPS data provided by the DSRC-compliant GPS unit 250 and determine what lane the ego vehicle 123 is traveling in based on the relative positions of two or more different vehicles (one of which is, for example, the ego vehicle 123) traveling on the roadway at the same time.

By comparison to the DSRC-compliant GPS unit 250, a conventional GPS unit which is not compliant with the DSRC standard is unable to determine the location of an ego vehicle 123 with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to identify a lane of travel for an ego vehicle 123 based on GPS data alone.

In some embodiments, the GPS data provided by the DSRC-compliant GPS unit 250 is a type of sensor data 192 that is stored in the memory 127. The GPS data may be included in the context data 191. For example, the GPS data describes a location of the V2X transmitter with an accuracy of substantially plus or minus half a width of a roadway which is being traveled by the V2X transmitter; this GPS data is included in the context data so that the context data describes the location of the V2X transmitter with the accuracy of substantially plus or minus half a width of the roadway which is being traveled by the V2X transmitter.

In the illustrated embodiment shown in FIG. 2, the context system 199 includes: a communication module 202; and a determination module 204.

The communication module 202 can be software including routines for handling communications between the context system 199 and other components of the operating environment 100 of FIG. 1.

In some embodiments, the communication module 202 can be a set of instructions executable by the processor 125 to provide the functionality described below for handling communications between the context system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

In some embodiments, the communication module 202 can be a set of instructions executable by the processor 125 to provide the functionality described below for handling communications between the context system 199 of a vehicle depicted in FIG. 1 and other components of the operating environment 100. In some embodiments, the communication module 202 sends and receives data, via the communication unit 145, to and from one or more elements of the operating environment 100. For example, the communication module 202 receives or transmits, via the communication unit 145, some or all of the digital data stored on the memory 127. The communication module 202 may send or receive any of the digital data or wireless messages (e.g., V2X messages) described above with reference to FIG. 1 or below with reference to FIGS. 2-6, via the communication unit 145.

In some embodiments, the communication module 202 receives data from components of the context system 199 and stores the data in the memory 127 (or a buffer or cache of the memory 127, or a standalone buffer or cache which is not depicted in FIG. 2). For example, the communication module 202 broadcasts a V2X message including the V2X data 195 from the communication unit 145 at a regular interval such as once every 0.1 seconds.

In some embodiments, the communication module 202 may handle communications between components of the context system 199. For example, the communication module 202 transmits the sensor data 192 from the memory 127 to the determination module 204 so that the determination module 204 is able to form V2X data 195 including the context data 191 as an element of the V2X data 195.

In some embodiments, the determination module 204 can be a set of instructions executable by the processor 125 which are operable, when executed by the processor 125, to cause the processor 125 to execute one or more steps of the method 300 described below with reference to FIGS. 3A-3C. In some embodiments, the determination module 204 can be stored in the memory 127 of the computer system 200 and can be accessible and executable by the processor 125. The determination module 204 may be adapted for cooperation and communication with the processor 125 and other components of the computer system 200 via signal line 224.

In some embodiments, the computer system 200 is an element of an ego vehicle and a remote vehicle. For example, the ego vehicle includes a computer system 200 and the remote vehicle includes its own computer system 200. The ego vehicle broadcasts a DSRC message which is received by the remote vehicles. This DSRC message includes DSRC data. The DSRC data describes information about the ego vehicle which may be critical for the remote vehicles. For example, a remote vehicle may be an autonomous vehicle that needs to track each of the other vehicles in its environment. When the remote vehicle receives a DSRC message, it needs to identify which of the vehicles in its environment transmitted this DSRC message so that it will know which of these vehicles is described by the DSRC data included in the DSRC message. For example, assume a remote vehicle is traveling on a roadway with a large number of vehicles in its vicinity. One of the vehicles in the vicinity of the remote vehicle is the ego vehicle which broadcast the DSRC message that was received by the remote vehicle. The DSRC data included in this DSRC message may describe an important or dangerous event (e.g., the DSRC data describes that the ego vehicle expects to suddenly change its heading, speed, or take some action that might cause a collision with the remote vehicle) and the remote vehicle needs to know which of the vehicles in its vicinity is the ego vehicle so that the remote vehicle will know how to avoid a collision with the ego vehicle due to the change which is described by the DSRC data. The DSRC data imprecisely describes the geographic location of the ego vehicle (e.g., with a precision of plus or minus 10 meters). The precision of this geographic information is insufficient to enable the remote vehicle to identify which of the vehicles on the roadway is actually the ego vehicle. So, in practice, the DSRC data is insufficient to enable vehicles such as the remote vehicle to be able to quickly, accurately, and reliably identify which of the other vehicles on the roadway is an ego vehicle that transmitted a particular DSRC message which is received by the remote vehicle. The context data solves this problem.

The context data is digital data that describes the context of the ego vehicle so that the one or more remote vehicles can identify or locate the ego vehicle among many other vehicles. The context data describes one or more of the following: a color of the ego vehicle; an image of the ego vehicle; an object prior of the ego vehicle; a description of which lane the ego vehicle is currently traveling in; an image of a vehicle or object which is to the left of the ego vehicle; an image of the vehicle or object that is to the right of the ego vehicle; a description of the license plate number of the ego vehicle; and some other identifying information.

Example Processes

Figure 3A:
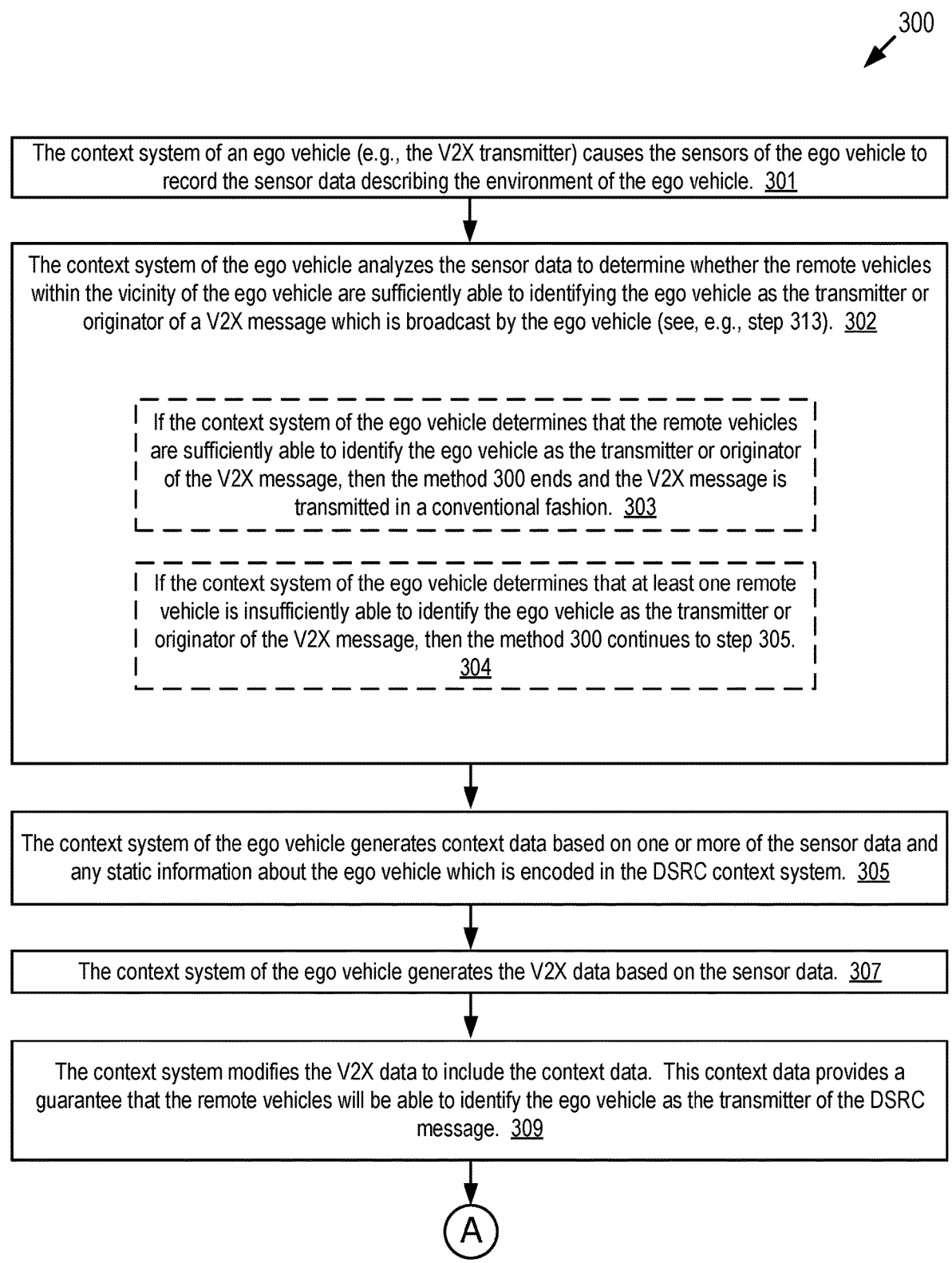
Figure 3B:
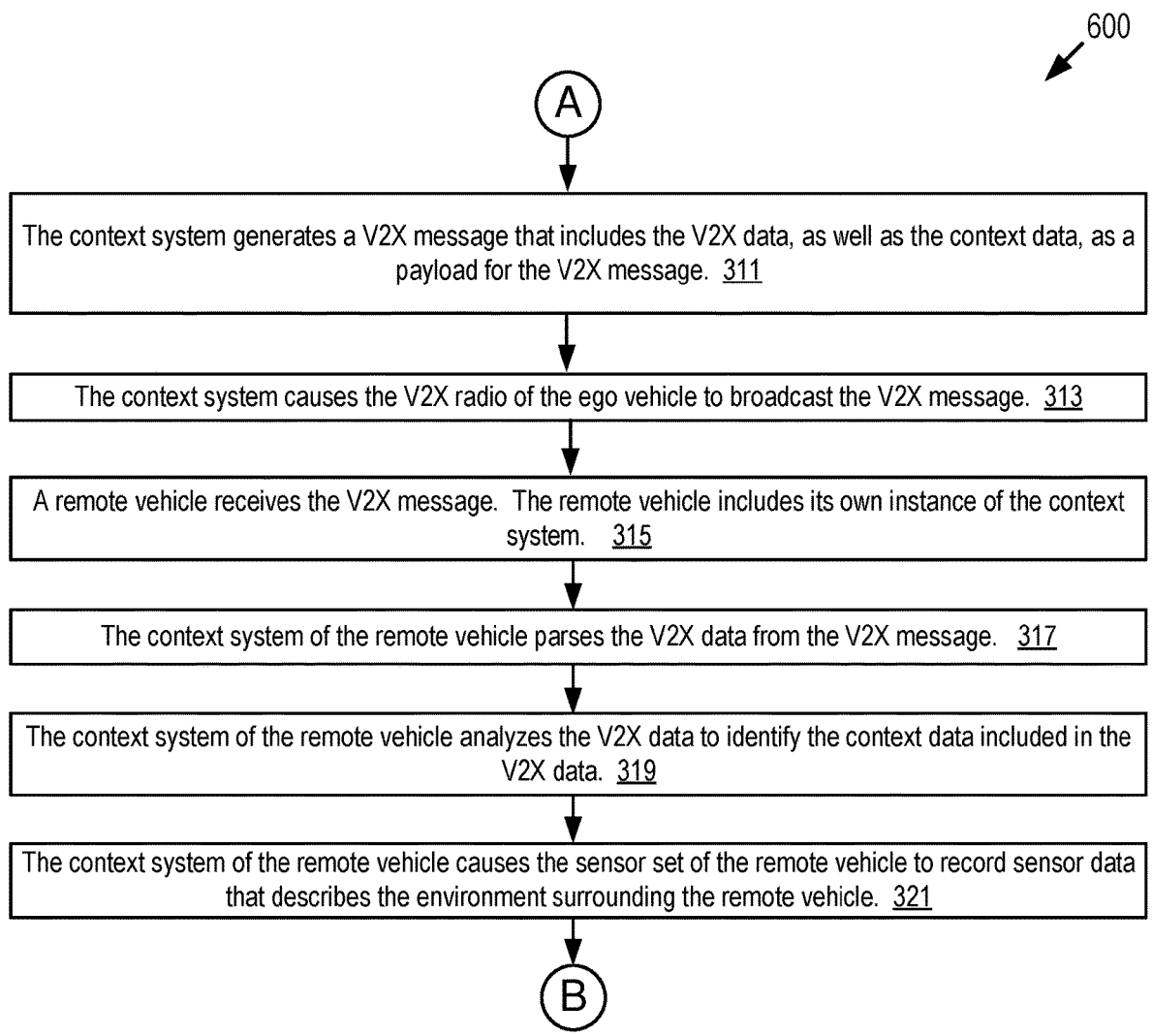

FIGS. 3A-3C depict a method 300 for modifying an operation of a vehicle component (e.g., an ADAS system, an autonomous driving system, etc.) based on V2X data that includes context data according to some embodiments. The steps of the method 300 are executable in any order, and not necessarily the order depicted in FIGS. 3A-3C.

At step 301, the context system of an ego vehicle (e.g., the V2X transmitter) causes the sensors of the ego vehicle to record the sensor data describing the environment of the ego vehicle.

At step 302, the context system of the ego vehicle analyzes the sensor data to determine whether the remote vehicles within the vicinity of the ego vehicle are sufficiently able to identify the ego vehicle as the transmitter or originator of a V2X message which is broadcast by the ego vehicle (see, e.g., step 313). For example, the context system analyzes the sensor data to determine a perspective of the remote vehicles and whether the onboard sensors of the remote vehicle will be able to identify the ego vehicle as the transmitter of the V2X message based on the V2X data included in the V2X message.

No existing solution includes a V2X transmitter that proactively determines whether V2X receivers will struggle to identify the V2X transmitter among other potential V2X transmitters.

In some embodiments, the context system determines a likelihood that the remote vehicles will be able to identify the ego vehicle as the transmitter. The context system may store threshold data that describes a threshold. The context system compares the likelihood to the threshold. The context system determines whether the remote vehicles within the vicinity of the ego vehicle are sufficiently able to identify the ego vehicle as the transmitter or originator of a DSRC message which is broadcast by the ego vehicle based on this comparison to the threshold. If the threshold is met or exceeded, then the remote vehicles are sufficiently able to identify the ego vehicle as the transmitter or originator of a DSRC message which is broadcast by the ego vehicle; otherwise, the remote vehicles are not sufficiently able to identify the ego vehicle as the transmitter or originator of a DSRC message which is broadcast by the ego vehicle.

As used herein, the terms "originator" and "transmitter" of a V2X message are intended to mean the vehicle that originally transmitted a particular V2X message and is not merely an endpoint that is relaying the V2X message.

At sub-step 303, if the context system of the ego vehicle determines that the remote vehicles are sufficiently able to identify the ego vehicle as the transmitter or originator of the V2X message, then the method 300 ends and the V2X message is transmitted in a conventional fashion.

At sub-step 304, if the context system of the ego vehicle determines that at least one remote vehicle is insufficiently able to identify the ego vehicle as the transmitter or originator of the V2X message, then the method 300 continues to step 305.

At step 305, the context system of the ego vehicle generates context data based on one or more of the sensor data and any static information about the ego vehicle which is encoded in the DSRC context system.

At step 307, the context system of the ego vehicle generates the V2X data based on the sensor data.

At step 309, the context system modifies the V2X data to include the context data. This context data provides a guarantee that the remote vehicles will be able to identify the ego vehicle as the transmitter of the DSRC message.

No other V2X messages include digital data that provides a similar guarantee.

Referring now to FIG. 3B, at step 311 the context system generates a V2X message that includes the V2X data, as well as the context data, as a payload for the V2X message.

No other V2X message includes the context data, or information similar to the context data, in its payload.

At step 313, the context system causes the V2X radio of the ego vehicle to broadcast the V2X message.

At step 315, a remote vehicle receives the V2X message. The remote vehicle includes its own instance of the context system.

At step 317, the context system of the remote vehicle parses the V2X data from the V2X message.

At step 319, the context system of the remote vehicle analyzes the V2X data to identify the context data included in the V2X data.

At step 321, the context system of the remote vehicle causes the sensor set of the remote vehicle to record sensor data that describes the environment surrounding the remote vehicle.

Referring now to FIG. 3C, at step 323 the context system of the remote vehicle compares the sensor data to the context data to identify which of the vehicles in the vicinity of the remote vehicle is the transmitter or originator of the V2X message.

For example, at sub-step 324, if the context data describes a color of the ego vehicle and the lane of travel for the ego vehicle, then the sensor data captured by the onboard sensors of the remote vehicle at step 321 includes an image of the roadway environment. The context system of the remote vehicle analyzes the image to determine whether a vehicle having the color described by the context data is present and whether this vehicle is also traveling in the lane of travel which is described by the context data. If so, then this is a preliminary match. The context system may then compare other information included in the V2X data (e.g., speed, heading, acceleration, etc.) to determine whether the preliminary match is still good. If so, then the identity of the ego vehicle which transmitted the V2X message is now considered to be known.

Another example of step 323 is described at sub-step 335. At sub-step 335, if the context data is an object prior of the ego vehicle, then the sensor data captured by the onboard sensors of the remote vehicle at step 321 includes an image of the roadway environment. The context system of the remote vehicle compares an image of the environment to the object prior of the ego vehicle to determine whether the roadway environment includes the ego vehicle and if so, which object in the roadway environment is actually the ego vehicle. This step may include: determining a number of objects in the image which is described by the sensor data collected at step 321; determining bounding boxes for each of the objects in the image; comparing the object prior to each of the objects included in each of the bounding boxes; and determining whether a match is present between the objects in the bounding boxes and the object prior which was described by the context data.

At step 326, the context system of the remote vehicle inserts identity data in the V2X data to identify which of the vehicles in the vicinity of the remote vehicle is the transmitter or originator of the V2X message.

At step 327, the context system of the remote vehicle causes an ADAS system or some other vehicle component of the remote vehicle to take a vehicular action responsive to the V2X data and the identity of the transmitter of the V2X message that included the V2X data. For example, the context system of the remote vehicle causes an ADAS system of the remote vehicle to execute a remedial action to avoid a collision with the ego vehicle, track the path of travel of the ego vehicle, or some other action which is beneficial to the remote vehicle.

Referring now to FIG. 4, depicted is a block diagram illustrating an example of the V2X data 195 according to some embodiments.

The regular interval for transmitting BSMs may be user configurable. In some embodiments, a default setting for this interval may be transmitting the BSM every 0.1 seconds or substantially every 0.1 seconds.

A BSM is broadcasted over the 5.9 GHz DSRC band. DSRC range may be substantially 1,000 meters. In some embodiments, DSRC range may include a range of substantially 100 meters to substantially 1,000 meters. DSRC range is generally 300 to 500 meters depending on variables such as topography and occlusions between DSRC-equipped endpoints.

Referring now to FIG. 5, depicted is a block diagram illustrating an example of V2X data 195 according to some embodiments.

A BSM may include two parts. These two parts may include different V2X data 195 as shown in FIG. 5.

Part 1 of the V2X data 195 may describe one or more of the following: the GPS data of the vehicle; vehicle heading; vehicle speed; vehicle acceleration; vehicle steering wheel angle; and vehicle size.

Part 2 of the V2X data 195 may include a variable set of data elements drawn from a list of optional elements. Some of the V2X data 195 included in Part 2 of the BSM are selected based on event triggers, e.g., anti-locking brake system ("ABS") being activated may trigger V2X data 195 relevant to the ABS system of the vehicle.

In some embodiments, some of the elements of Part 2 are transmitted less frequently in order to conserve bandwidth.

In some embodiments, the V2X data 195 included in a BSM includes current snapshots of a vehicle.

Referring now to FIG. 6, depicted is a block diagram illustrating an example of the context data 191 according to some embodiments. FIG. 6 also depicts information about potential sources of context data 191 according to some embodiments.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for modifying an operation of a vehicle component based on a Vehicle-to-Everything (V2X) communication, the method comprising:
   receiving, by a V2X receiver, a V2X message including context data that describes a context of a V2X transmitter in an environment, wherein the V2X receiver is not sufficiently able to identify the V2X transmitter as an originator of the V2X message within the environment;
   determining, by the V2X receiver, digital data describing an identity of the V2X transmitter as the originator of the V2X message within the environment based on the context data; and
   modifying the operation of the vehicle component of the V2X receiver based on the digital data describing the identity of the V2X transmitter.

2. The method of claim 1, wherein:
   the environment is a roadway environment that includes the ego vehicle and a remote vehicle that receives the V2X message; and
   the context data further describes a context of an ego vehicle within the roadway environment.

3. The method of claim 1, wherein the V2X message is not one of the following: a WiFi message; a 3G message; a 4G message; a 5G message; a Long-Term Evolution (LTE) message; a millimeter wave communication message; a Bluetooth message; and a satellite communication.

4. The method of claim 1, wherein the V2X message is a Basic Safety Message.

5. The method of claim 1, wherein the context data describes a location of the V2X transmitter with an accuracy of substantially plus or minus half a width of a roadway which is being traveled by the V2X transmitter.

6. The method of claim 1, wherein the V2X transmitter is an ego vehicle.

7. The method of claim 1, wherein the V2X receiver is an autonomous vehicle.

8. A system for modifying an operation of a vehicle component based on a Vehicle-to-Everything (V2X) communication, the system included in a V2X receiver and comprising:
   a processor; and
   a non-transitory memory communicatively coupled to the processor, wherein the non-transitory memory stores computer code that is operable, when executed by the processor, to cause the processor to execute steps comprising:
      receiving a V2X message including context data that describes a context of a V2X transmitter in an environment, wherein the V2X receiver is not sufficiently able to identify the V2X transmitter as an originator of the V2X message within the environment;
      determining digital data describing an identity of the V2X transmitter as the originator of the V2X message within the environment based on the context data; and
      modifying the operation of the vehicle component of the V2X receiver based on the digital data describing the identity of the V2X transmitter.

9. The system of claim 8, wherein:
   the environment is a roadway environment that includes the ego vehicle and a remote vehicle that receives the V2X message; and
   the context data further describes a context of an ego vehicle within the roadway environment.

10. The system of claim 8, wherein the V2X message is not one of the following: a WiFi message; a 3G message; a 4G message; a 5G message; a Long-Term Evolution (LTE) message; a millimeter wave communication message; a Bluetooth message; and a satellite communication.

11. The system of claim 8, wherein the V2X message is a Basic Safety Message.

12. The system of claim 8, wherein the context data describes a location of the V2X transmitter with an accuracy of substantially plus or minus half a width of a roadway which is being traveled by the V2X transmitter.

13. The system of claim 8, wherein the V2X transmitter is an ego vehicle.

14. The system of claim 8, wherein the V2X receiver is an autonomous vehicle.

15. A computer program product operable to modify an operation of a vehicle component based on a Vehicle-to-Everything (V2X) communication, wherein the computer program product comprises a non-transitory memory storing instructions that, when executed by a processor of a V2X receiver, cause the processor to perform operations comprising:

receiving a V2X message including context data that describes a context of a V2X transmitter in an environment, wherein the V2X receiver is not sufficiently able to identify the V2X transmitter as an originator of the V2X message within the environment;

determining digital data describing an identity of the V2X transmitter as the originator of the V2X message within the environment based on the context data; and modifying the operation of the vehicle component of the V2X receiver based on the digital data describing the identity of the V2X transmitter.

16. The computer program product of claim 15, wherein:
the environment is a roadway environment that includes the ego vehicle and a remote vehicle that receives the V2X message; and
the context data further describes a context of an ego vehicle within the roadway environment.

17. The computer program product of claim 15, wherein the V2X message is not one of the following: a WiFi message; a 3G message; a 4G message; a 5G message; a Long-Term Evolution (LTE) message; a millimeter wave communication message; a Bluetooth message; and a satellite communication.

18. The computer program product of claim 15, wherein the context data describes a location of the V2X transmitter with an accuracy of substantially plus or minus half a width of a roadway which is being traveled by the V2X transmitter.

19. The computer program product of claim 15, wherein the V2X transmitter is an ego vehicle.

20. The computer program product of claim 15, wherein the V2X receiver is an autonomous vehicle.

* * * * *